(12) United States Patent
Romano et al.

(10) Patent No.: US 10,255,338 B2
(45) Date of Patent: Apr. 9, 2019

(54) SYSTEM AND METHOD FOR FILE MANAGEMENT IN DATA STRUCTURES

(71) Applicant: BANK OF AMERICA CORPORATION, Charlotte, NC (US)

(72) Inventors: Brad E. Romano, Furlong, PA (US); Shashi Thanikella, North Brunswick, NJ (US)

(73) Assignee: Bank of America Corporation, Charlotte, NC (US)

( * ) Notice: Subject to any disclaimer, the term of this patent is extended or adjusted under 35 U.S.C. 154(b) by 246 days.

(21) Appl. No.: 15/277,276

(22) Filed: Sep. 27, 2016

(65) Prior Publication Data

US 2018/0089293 A1    Mar. 29, 2018

(51) Int. Cl.
G06F 17/00 (2006.01)
G06F 17/30 (2006.01)

(52) U.S. Cl.
CPC .. G06F 17/30563 (2013.01); G06F 17/30117 (2013.01); G06F 17/30191 (2013.01)

(58) Field of Classification Search
CPC ............... G06F 17/30; G06F 17/30563; G06F 17/30117
USPC ................................................. 707/600–899
See application file for complete search history.

(56) References Cited

U.S. PATENT DOCUMENTS

| | | | |
|---|---|---|---|
| 5,475,668 A | 12/1995 | Azumatani et al. | |
| 7,664,783 B2 | 2/2010 | Mori | |
| 8,107,792 B2 | 1/2012 | Kim et al. | |
| 8,375,072 B1 | 2/2013 | Burgess et al. | |
| 8,396,909 B1 | 3/2013 | Burgess et al. | |
| 8,799,336 B1 | 8/2014 | Burgess et al. | |
| 2007/0179983 A1* | 8/2007 | Putman | G06F 17/303 |
| 2012/0005162 A1 | 1/2012 | Adkins et al. | |

OTHER PUBLICATIONS

U.S. Appl. No. 15/277,159, Romano, et al. entitled "Machine Learning Method and System for Predicting File Controls", filed Sep. 27, 2016.

(Continued)

*Primary Examiner* — Isaac M Woo
(74) *Attorney, Agent, or Firm* — Baker Botts L.L.P.

(57) ABSTRACT

A system for file management in data structures is disclosed. The system includes a memory, an extraction engine, an enrichment engine, a portal, and a transmission engine. The memory stores a first database and a memory. The extraction engine extracts columns and fields and associates them with extracted terms. The enrichment engine determines an end-to-end dataflow of the data from extracted metadata and loads the associated data into the memory. Enrichment engine performs either a full load comprising loading all the associated data onto the memory or a delta load comprising comparing the extracted data with data stored in the memory and loading any different data from the extracted data onto the memory. The enrichment engine also generates a journal recording metadata associated with the full or delta load. A portal displays the end-to-end dataflow of the associated data and a transmission engine transmits communication identifying incomplete associated data.

20 Claims, 4 Drawing Sheets

(56) References Cited

OTHER PUBLICATIONS

U.S. Appl. No. 15/277,418, Romano, et al, entitled "System and Method for Inter-Program File Control Communication", filed Sep. 27, 2016.
U.S. Appl. No. 15/277,541, Romano, et al. entitled "System and Method for Data Structure Migration Control", filed Sep. 27, 2016.

* cited by examiner

SYSTEM AND METHOD FOR FILE MANAGEMENT IN DATA STRUCTURES

TECHNICAL FIELD OF THE INVENTION

This invention generally relates to data structures and specifically relates to systems and methods for file management in data structures.

BACKGROUND OF THE INVENTION

As computer systems and networks have become more complex, management of the data structures within these systems increasingly presents several technical challenges. Systems and methods for managing files within data structures, for example, have proved inadequate in various respects. Accordingly, there is a need for robust file management systems for expansive data structures.

SUMMARY OF THE INVENTION

A system comprising a database, a memory, an extraction engine, an enrichment engine, a portal, and a transmission engine is disclosed. The extraction engine extracts database columns identifying one or more columns within a file and extracts one or more terms identifying the file from the database. The extraction engine also extracts one or more file fields comprising data stored in one or more fields of the file from the database and associates one or more of the extracted columns and file fields with one or more of the extracted terms. Further, the extraction engine extracts metadata identifying source information of the extracted one or more columns, file fields, and terms. The enrichment engine then determines an end-to-end dataflow of the associated data by identifying a source of the extracted columns, file fields, and terms. The enrichment engine loads the associated data into the memory which comprises performing either a full load loading all the associated data onto the memory or a delta load comprising comparing the extracted database columns, file fields, and terms with data stored in the memory and loading any different data from the extracted data onto the memory. The enrichment engine is also operable to generate a journal recording metadata associated with the full load or the delta load. Next, a portal displays the end-to-end dataflow of the associated data on a user interface and a transmission engine transmits communication identifying incomplete associated data.

The present embodiment presents several technical advantages. For example, one embodiment of the disclosed system overcomes the technical limitations of generic computer systems by storing and presenting metadata associated with data stored in data structures in a manner that conserves memory resources and effectively displays the metadata. For example, in the present embodiment, a centralized system extracts and presents all metadata associated with data stored in a separate database. This conserves memory resources of the memory storing the database by allowing that memory to be dedicated to storing data while a separate system can store and present the relevant metadata. This also improves processor functionality because the processor associated with the disclosed system may be optimized to perform the extraction and enrichment without having to dedicate processing resources to manage and process incoming data.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE INVENTION

Figure 1:
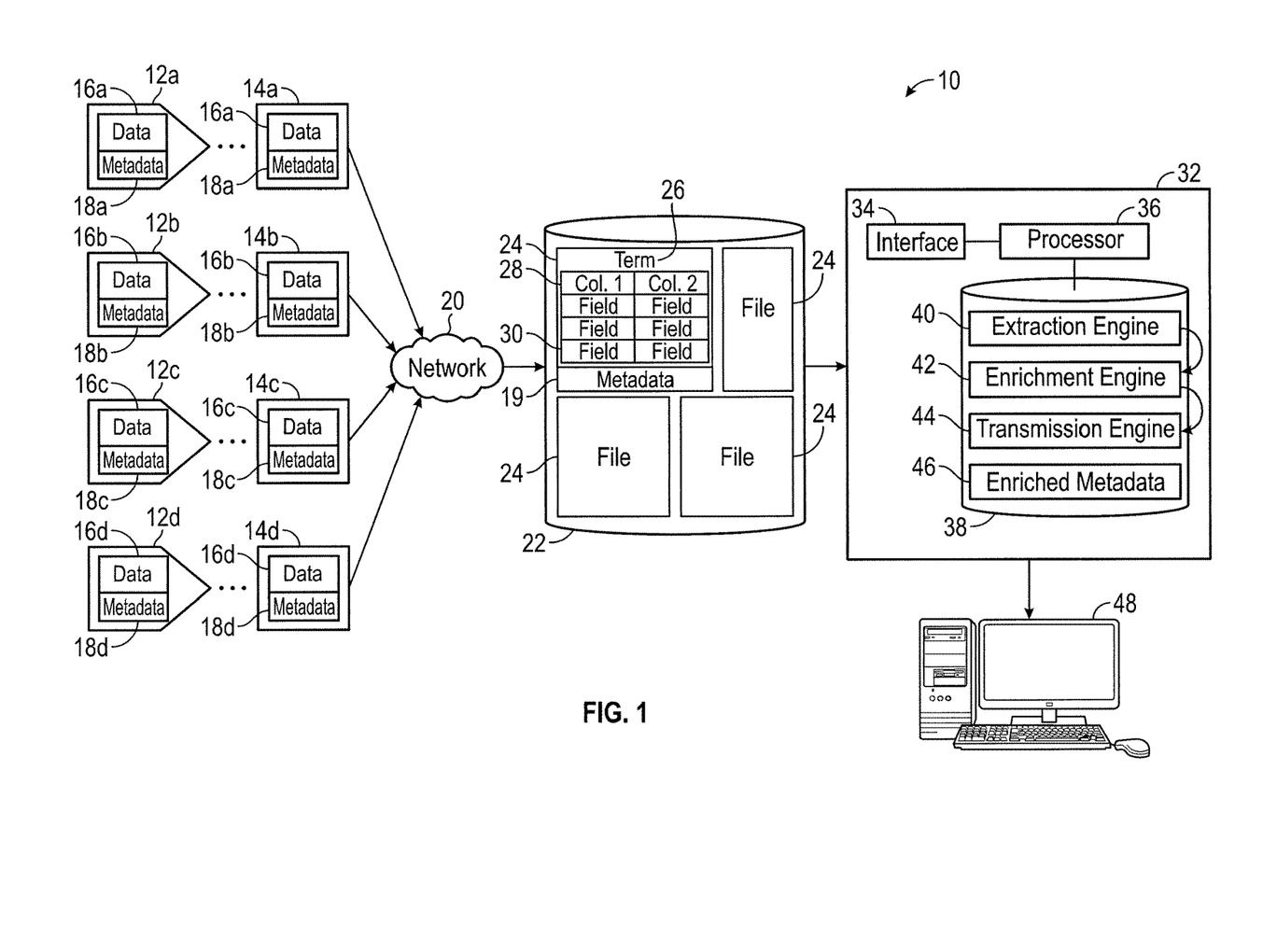
FIG. 1 illustrates an overall system showing dataflow for a file management system in a data structure.
Figure 2:
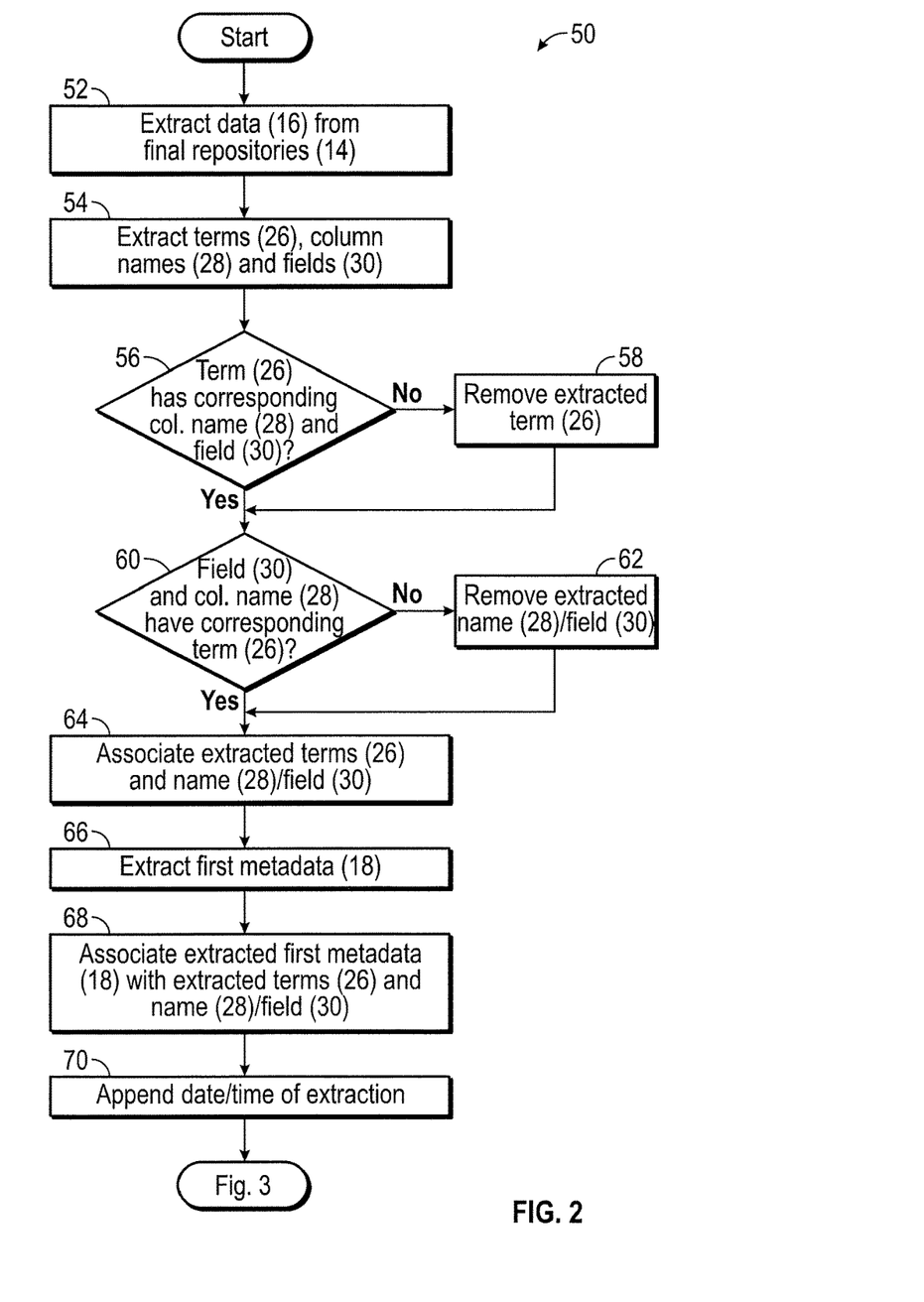
FIG. 2 illustrates a process executed by an extraction engine of the file management system.
Figure 3:
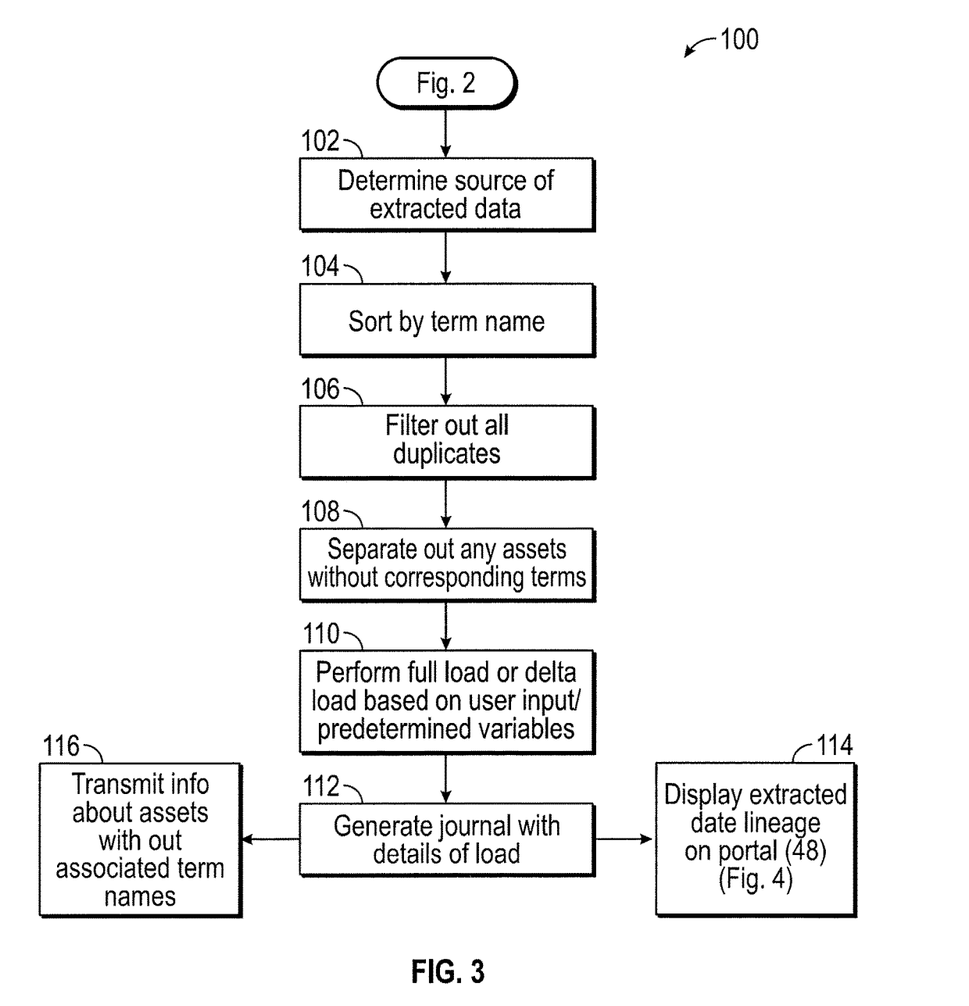
FIG. 3 illustrates a process executed by an enrichment engine of the file management system.

Embodiments of the present disclosure are best understood by referring to FIGS. 1 through 3 of the drawings, like numerals being used for like and corresponding parts of the various drawings.

Computer systems and networks are used in industries and home environments. Increasingly, industries relying on these computer systems and networks are beginning to push up against the technical limitations of such systems. One technical challenge faced by modern day computer systems is managing metadata of files within memory structures. Generally, metadata is data about data. Metadata may include such information as the source of a file, the size of a file, the date a file was created, among others. Standard data management structures store files but are incapable of effectively storing and presenting metadata related to those files in a manner that does not deplete the computer memory and also allows for ready access to the metadata.

One approach for storing metadata is to store such data along with its corresponding files in repositories. For example, a memory may store a file and an address for its source in the same repository. However, this approach is unworkable for modern-day file systems that comprise expansive sets of information that often overlap. For example, a computer system may receive files from three different secondary sources. Each secondary source may, in turn, receive the information from three different primary sources. In such systems, it is technically challenging to track the secondary and primary sources of information for each of the files, especially when the files are not all stored in one location. For example, a first file may comprise information "x". A second file may comprise information "x,y". The first file may be stored in repository A and the second file may be stored in repository B. Information "x" in the first file may originate from source S1 and information "x" in the second file may originate from source S2. If, in such a situation, a third party, such as a regulator, needs to know the source of information "x", the system will be unable to provide an accurate answer because information "x" originates from both source S1 and S2.

One approach for avoiding such an issue is provided in the present disclosure. In one embodiment of the present disclosure, a metadata management system with a database and a memory is disclosed. This metadata management system operates in at least two stages. In the first stage, the database receives files and metadata associated with those files from several disparate file repositories. This database is divided into two sections. One section of this database comprises "terms" and the other section comprises "assets." Terms are words of phrases that describe one or more aspects of data or files, such as, for example, file names or identifiers. Assets are the data stored in the files, such as, for example, metadata. Some or all of the assets in the database correspond to terms.

In the second stage, the disclosed system extracts terms and assets from the database and associates the assets with the corresponding terms. Then, the system enriches the extracted data by eliminating any duplicates by retaining the terms and assets that have the longest end-to-end dataflow. In other words, the system compares the originating source as well as any intermediary users of the extracted assets and terms and retains the terms and assets that can be traced back the farthest. In other embodiments, the system may retain the terms and assets that have the highest refresh rate, were most recently generated, or have any other similar characteristic. The system then loads this enriched data into the memory. The system can either load all the enriched data or compare the enriched data to data already stored in the database and load only the difference.

After loading the enriched data, in one embodiment, the system displays the loaded data on a portal. This portal may be accessible by a user such as a regulator who may wish to know the end-to-end lineage of the data. The system may also generate communication, such as an email, to alert a user of any assets that do not have corresponding term names so that the user may provide the missing terms names.

The present disclosure will be described in more detail using FIGS. 1 through 3. FIG. 1 illustrates an overall system showing dataflow for a file management system in a data structure. FIG. 2 illustrates a process executed by an extraction engine of the file management system. And FIG. 3 illustrates a process executed by an enrichment engine of the file management system. Although the figures illustrate specific processes using specific steps in specific orders, other embodiments may comprise other similar processes comprising the same or other similar steps in the same or other order without departing from the spirit of the disclosure.

FIG. 1 illustrates a system 10 comprising original file repositories 12a, 12b, 12c, and 12d that store data 16a, 16b, 16c, and 16d and first metadata 18a, 18b, 18c, and 18d. Data 16 and first metadata 18 from original file repositories 12 traverses one or more additional file repositories and is eventually transferred to final file repositories 14a, 14b, 14c, and 14d. Database 22 receives data 16 and first metadata 18 from final file repositories 14 via network 20. In one embodiment, database 22 stores the received data in files 24. A processing engine 32 then extracts the files 24 from database 22 and processes them. Processing engine 32 comprises an interface 34, a processor 36, and a memory 38. Memory 38 stores an extraction engine 40, an enrichment engine 42, a transmission engine 44, and enriched metadata 46. Enriched metadata 46 may then be accessed by downstream computer systems 48.

Original file repositories 12a, 12b, 12c, and 12d are programs, processes, databases, or other sources of information that generate or provision data 16a, 16b, 16c, and 16d and first metadata 18a, 18b, 18c, and 18d. Original file repositories 12 may be sources of data 16 internal to an enterprise, external third party sources or any combination of the two. For example, original file repository 12a may provision data 16a from a department within a company whereas original file repository 12b may provision data 16b collected over the Internet. Original file repositories 12a, 12b, 12c, and 12d may provision any suitable type of data 16. For example, original file repositories 12a, 12b, 12c, and 12d may provision text data 16, code, data 16 regarding time or date, numbers or any other suitable type of data 16.

Original file repositories 12a, 12b, 12c, and 12d may further provision first metadata 18 associated with the data 16. For example, original file repositories 12a, 12b, 12c, and 12d may include first metadata 18 such as information about the size of data 16, the source of data 16, the time and date that data 16 was last updated, among other similar information. Original file repositories 12a, 12b, 12c, and 12d may further format the provisioned data 16 in any appropriate manner. For example, original file repositories 12a, 12b, 12c, and 12d may provide date data in mm/dd/yyyy format or mmddyy format.

In some embodiments, original file repositories 12 provision data 16 and first metadata 18 to one or more additional repositories 14 before data 16 and first metadata 18 is provisioned to a central database 22. For example, in one embodiment, data 16a and first metadata 18a originate from original file repository 12a, are transmitted to one or more additional repositories, then are transmitted to final file repository 14a, and then onto database 22 via network 20. In various embodiments, original file repositories 12 and final file repositories 18 may be similar or different. In some embodiments, system 10 may not have any original file repositories 12 and may only have final file repositories 14.

Network 20 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Network 20 may additionally include any combination of gateways, routers, hubs, switches, access points, base stations, wireless telephone systems and any other hardware, software or a combination thereof. Network 20 may include any interconnecting system capable of transmitting audio, video, signals, data, messages, or any combination of the preceding between final file repositories 14a, 14b, 14c, and 14d, database 22, processing engine 32, and any other portion of system 10.

Database 22 is any computer memory structure that comprises a collection of data in schemas, tables, queries, reports, views, and/or other similar objects. Database 22 may be of any suitable type including a relational database, object database, XML database, among others. In one embodiment, database 22 stores information received by final file repositories 14 in one or more files 24. Files 24 may further comprise terms 26, column names 28, and file fields 30. Terms 26 may identify categories or file 24 names associated with column names 28 and field fields 30. Column names 28 may identify a particular category of file fields 30. File fields 30 may comprise data entries. For example, a term 26 might be associated with the number of employees in an enterprise. Each column name 28 may refer to a group within the enterprise. And each file field 30 may list the name or ID of a particular employee within that group.

Database 22 may further comprise second metadata 19. Second metadata 19 may be the same as or different from first metadata 18. Second metadata 19 may comprise such information as the source of data in file 24, the size of file 24, the date data in file 24 was created, and other similar information about file 24 and the terms 26, column names 28, and file fields 30 within database 22.

In the illustrated embodiment, processing engine 32 is any module that comprises an interface 34, a processor 36 and a memory 38. Engine 32 may communicate with other aspects of system 10 via network 20. Engine 32 receives information stored in database 22, enriches that information by associating term 26, column names 28, and file fields 30 with second metadata 19, and packages the enriched data 46 so that it may be viewed by third parties.

Interface 34 represents any port or connection, real or virtual, including any suitable hardware and/or software, including protocol conversion and data processing capabilities, to communicate through a LAN, WAN, or other communication system that allows controller 16 to exchange information with the other components of system 10. Interface 34 may communicate with processor 36 and memory 38.

Processor 36 may be any electronic circuitry, including, but not limited to microprocessors, application specific integrated circuits (ASIC), application specific instruction set processor (ASIP), and/or state machines, that communicatively couples interface 34 and memory 38 and controls the operation of controller 16. In some embodiments, processor 36 may be single core or multi-core having a single chip containing two or more processing devices. Processor 36 may be 8-bit, 16-bit, 32-bit, 64-bit or of any other suitable architecture. Processor 36 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 36 may include other hardware and software that operates to control and process information. Processor 36 may execute computer-executable program instructions stored in memory 38. Processor 36 is not limited to a single processing device and may encompass multiple processing devices.

Memory 38 may include any one or a combination of volatile or non-volatile local or remote devices suitable for storing information. For example, memory 38 may include RAM, ROM, flash memory, magnetic storage devices, optical storage devices, network storage devices, cloud storage devices, solid state devices, or any other suitable information storage device or a combination of these devices. Memory 38 stores, either permanently or temporarily, data, operational software, other information for engine 32, database 22, or other components of system 10. For example, memory 38 may store user preferences or default settings for operating engine 32. Memory 38 may store information in one or more databases, file systems, tree structures, relational databases, any other suitable storage system, or any combination thereof. Furthermore, different information stored in memory 38 may use any of these storage systems. The information stored in memory 38 may be encrypted or unencrypted, compressed or uncompressed, and static or editable. Memory 38 may store information in one or more caches.

In one embodiment, memory 38 may store extraction engine 40, enrichment engine 42, transmission engine 44, and enriched metadata 46.

Extraction engine 40 may be any computer program that is executed by processing engine 32 to extract terms 26, column names 28, file fields 30, and second metadata 19 from database 22. Extraction engine 40 may also associate a unique ID with the extracted data along with a date/time of extraction. In other embodiments, extraction engine 40 may append any other suitable information such as the size of the extracted data and the date/time the data was last updated to the extracted information. Extraction engine 40 may extract data from database 22 based on any trigger including a user input, a request from a third party, an automated trigger, or any other suitable prompting. One embodiment of an algorithm employed by extraction engine 40 is illustrated in FIG. 2 and discussed in greater detail below.

Enrichment engine 42 may be any computer program that is executed by processing engine 32 to enrich the terms 26, column names 28, and file fields 30 extracted by extraction engine 40. For example, in one embodiment, enrichment engine 42 may enrich the extracted data by appending a security classification such as confidential, proprietary, public, or non-defined indicating access permissions to the extracted data. In such an embodiment, each classification may have a different and potentially overlapping set of users that is allowed to access the data. For example, users permitted to access proprietary data may also be allowed to view all public data but not vice-versa. Enrichment engine 42 may further transform the data from the disparate formats in which it is received into a standard format. For example, enrichment engine 42 may transform all currency data in US Dollars or all tabular data into .csv format.

In some embodiments, enrichment engine 42 may determine the source of the extracted terms 26, column names 28, and file fields 30 by analyzing second metadata 19. In one embodiment, enrichment engine 42 may analyze second metadata 19 to determine end-to-end dataflow information including information about any intermediary repositories 12 or programs that used and/or provisioned the extracted terms 26, column names 28, and file fields 30 and append that information to the extracted data to generate enriched metadata 46 before storing enriched metadata 46 memory 38. In some embodiments, enrichment engine 42 generates enriched metadata 46 by associating the extracted fields 30 and column names 28 with terms extracted from database 22 so that the determined end-to-end dataflow information is linked to terms 26 that are associated with specific column names 28 and file fields 30. Enrichment engine 42 may also identify column names 28 and/or file fields 30 that do not correspond to any terms 26. Enrichment engine 42 may further sort and filter data extracted by extraction engine 40 as illustrated, for example, in the embodiment of FIG. 3 and discussed in greater detail below.

Enrichment engine 42 also loads the enriched metadata 46 into memory 38. This improves the functioning of processing engine 32 generally and memory 38 specifically. By loading enriched metadata 46 into memory 38, enrichment engine 42 collects information received in disparate formats from disparate sources and centralizes it in one accessible format. This conserves the amount of space memory 38 needs to dedicate to storing the received data. For example, enrichment engine 42 filters specific data and sorts it so that less relevant or incomplete information is not stored in memory 38. Enrichment engine 42 also conserves memory 38 resources by associating second metadata 19 with terms 26, column names 28, and file fields 30 before storing the enriched data 46 in memory 38 so that memory 38 stores relevant second metadata 19 instead of a large, disjointed web of second metadata 19.

Enrichment engine 42 may load enriched metadata 46 into memory 38 as either a full load or a delta load. When performing a full load, enrichment engine 42 loads all the enriched metadata 46 into memory 38. When performing a delta load, enrichment engine 42 compares the enriched metadata 46 to data already stored in memory 38 and only stores data that is different than the data already stored in memory 38. For example, when performing a delta load, enrichment engine 42 may store data that is more recent, more complete, or different from the data stored in memory 38 in any other way. Enrichment engine 42 may perform a full load or a delta load based on any suitable input including an automated input or user input. For example, processing engine 32 may be operable to perform a delta load at a regular interval and processing engine 32 may perform a full load based on a user request. Enrichment engine 42 may also be operable to generate a journal documenting details of the load including whether processing engine 32 performed a delta load or a full load and the specific data that was changed or updated in a delta load.

Transmission engine 44 is any computer program that is executed by processing engine 32 and is operable to transmit enriched metadata 46 to a portal 48 and transmit information about incomplete or incorrect extracted data to a user or other system. Transmission engine 44 may further notify a user or other relevant system of any assets that do not have corresponding terms and of any terms 26 that do not have corresponding column names 28 or file fields 30. In one embodiment, transmission engine 44 may transmit an email to a user identifying such information.

Figure 4:
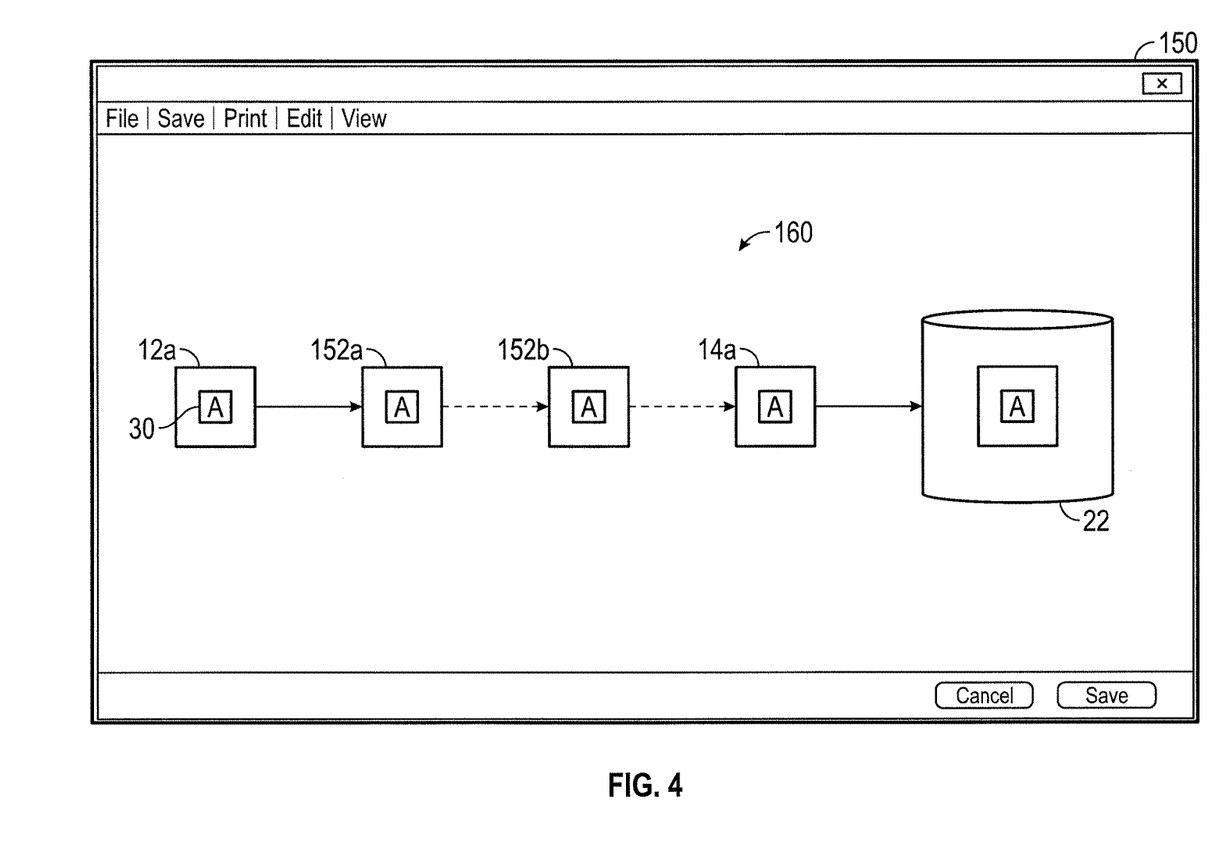
FIG. 4 illustrates one embodiment of an end-to-end dataflow displayed on a portal.

Portal 48 may be any computer workstation or other system that presents a graphical user interface ("GUI") that is operable to display enriched metadata 46 including the end-to-end dataflow of enriched data 32. Portal 48 may further utilize enriched metadata 46 in any suitable manner. For example, portal 48 may utilize enriched metadata 46 to determine the source of files 24 or determine the recency of file fields 30 in enriched metadata 46. In this manner, the overall functionality of portal 48 is improved because portal 48 receives enriched metadata 46 from one central memory 38 after the data has been processed and filtered. This overcomes a problem inherent in computer systems generally. Typically, computer systems may only analyze and use data in certain specific formats. When data is collected from multiple different sources in different formats, the computer systems must first transform the collected data into a common format, confirm its completeness, and ensure its correctness before the data may be used. The present system 10 obviates this inherent limitation of computer systems because, in system 10, portal 48 does not need to expend processing resources to collect, filter, and transform data transmitted by disparate file repositories 12 and 14. One example of a portal 48 is illustrated in FIG. 4 and discussed in greater detail below.

In operation, file repositories 12 and 14 provide data 16 and first metadata 18 via network 20 to database 22. Database 22 then aggregates and stores data 16 and first metadata 18 received from repositories 12 and 14. Next, extraction engine 40 extracts terms 26, column names 28, and file fields 30 from data 16 stored in database 22. Extraction engine 40 also extracts second metadata 19 from database 22. As noted above, second metadata 19 may be the same as or different from first metadata 18. So, for example, extraction engine 40 may extract a file field 30 identifying a product name "A", that is in a column name 28 comprising "Products" from a file associated with the term 26 "Inventory". In some embodiments, extraction engine 40 then associates identifiers and a time of extraction with the extracted data. One embodiment of the programming of extraction engine 40 is illustrated in FIG. 2 and discussed in greater detail below.

Enrichment engine 42 then determines the source of the information extracted by extraction engine 40. For example, enrichment engine 42 may determine that the product "A" associated with column name 28 "Products" was provisioned by original file repository 12a and that the term "Inventory" 26 was provisioned by original file repository 12b. Enrichment engine 42 then filters out duplicates, for example by eliminating all other instances of product name "A" and column name 28 "Products" from other extracted data.

In one embodiment, enrichment engine 42 may filter out any duplicative fields and column names 28 by retaining the assets with the longest end-to-end dataflow. For example, enrichment engine 42 may receive two instances of term 26 "Inventory," one that originates from original file repository 12a and another that originates from final file repository 14b. If the chain of repositories linking term 26 "Inventory" to original file repository 12a is longer than the chain of repositories linking term 26 "Inventory" to final file repository 14b, enrichment engine 42 may retain term 26 "Inventory" originating from original file repository 12a and delete term 26 "Inventory" originating from final file repository 14b.

Enrichment engine 42 may also identify any assets with no corresponding terms 26. For example, enrichment engine 42 may identify that product "A" from file field 30 does not have a corresponding term 26. Next, enrichment engine 42 performs either a full load or a delta load depending on user input, preprogrammed settings, or any other similar input. After performing the full or delta load, enrichment engine 42 may generate a journal comprising the details of the full or delta load including information about any updates or changes made to memory 38. Further, transmission engine 44 may provide the updated enriched data and metadata to a portal 48 for display. Transmission engine 44 may also communicate any terms with no corresponding assets and assets with no corresponding terms to a user or other systems. One embodiment of the programming of enrichment engine 42 and transmission engine 44 is illustrated in FIG. 3 and discussed in greater detail below.

FIG. 2 illustrates a process 50 employed by extraction engine 40 to prepare first data 16 and first metadata 18 for enrichment and transmission by enrichment engine 42 and transmission engine 44. As illustrated, at step 52, extraction engine 40 extracts data 16 from final repositories 14. Extraction engine 40 extracts data 16 by any suitable means including by prompting final repositories 14 to export or unload data 16. Final repositories 14 may export or unload data 16 as flat files or as tables or objects or other similar data units. Next, at step 54, extraction engine 40 extracts terms 26, column names 28, and fields 30 from the extracted data 16.

At step 56, extraction engine 40 associates the extracted terms 26 with the extracted column names 28 and fields 30. Then, extraction engine 40 determines if there are any terms 26 that do not correspond to extracted column name 28 or field 30. If extraction engine 40 finds such terms, at step 58, extraction engine 40 removes those extracted terms 26 from the extracted data 16. Next, at step 60, extraction engine 40 determines if there are any column names 28 and fields 30 that do not correspond to a term 26. Upon discovering such column names 28 and fields 30, at step 62, extraction engine 40 removes the unassociated extracted column names 28 and fields 30 from the extracted data 16. Next, at step 64, extraction engine 40 associates the remaining extracted terms 26 with extracted column names 28 and fields 30. Then, at step 66, extraction engine 40 extracts first metadata

18 from final repositories 14. Extraction engine 40 then associates the extracted first metadata 18 with extracted terms 26 and column names 28 and fields 30. Further, at step 70, extraction engine 40 appends a date and time of extraction to the extracted and associated terms 26, column names 28, fields 30, and metadata 18. In some embodiments, extraction engine 40 appends the time in Greenwich Mean Time (GMT). The extracted data 16 and metadata 18 is then transmitted to enrichment engine 42 as illustrated in FIG. 3 and explained in greater detail below.

FIG. 3 illustrates a process 100 employed by enrichment engine 42 and transmission engine 44 enrich and transmit terms 26, column names 28, file fields 30, and second metadata 19 extracted from database 22. In process 100, at step 102, enrichment engine 42 receives extracted data from extraction engine 40. Enrichment engine 42 then determines the source of the extracted data. Enrichment engine 42 may determine the source of the extracted data by analyzing second metadata 19 in any suitable manner. Enrichment engine 42 may determine the source of the extracted data by reviewing second metadata 19 associated with the extracted data, by requesting source information from a user, by requesting source information from another system, or in any other suitable manner. So, for example, enrichment engine 42 may determine that the term 26 "Inventory" comprises information provided by file repositories 12a and 12b, that the "Products" associated with the term 26 "Inventory" were provided by repository 12b, and that the specific product "A" was provisioned first by original file repository 12a to final file repository 14a and then to database 22. After determining the source of the extracted data, enrichment engine 42, at step 104, sorts the extracted data. Enrichment engine 42 may sort the extracted data in any suitable manner including on the term 26 name, by field 30 value, by recency of generation, or in any other suitable manner.

At step 106, enrichment engine 42 filters out duplicative extracted data. Enrichment engine 42 may do this in any suitable manner. For example, enrichment engine 42 may retain data that has the longest end-to-end data-flow or has a data source that extends back the farthest in a data-flow. So, for example, extraction engine 28 may extract two fields 30 identifying product "A." The first field 30 "A" may trace its source back to final file repository 14a. The second field 30 "A" may trace its source back to original file repository 12a then final file repository 14a. In such an embodiment, enrichment engine 42 may retain the field 30 "A" that can be traced back to original file repository 12a and remove the field 30 "A" that can only be traced back to final repository 14a. In other embodiments, enrichment engine 42 may filter out duplicates by retaining data that was refreshed or added most recently, by retaining terms 26 with the most fields 30 and column names 28 associated with the term 26, or in any other suitable manner. At step 108, enrichment engine separates out any assets that do not have a corresponding term 26. Enrichment engine also separates out any terms 26 that do not have corresponding column names 28 or file fields 30.

At step 110, enrichment engine 42 preforms either a full load or a delta load based on user input and/or predetermined settings. If the user input or predetermined settings call for a full load, then enrichment engine 42 uploads all of the extracted data into memory 38. For example, enrichment engine 42 may overwrite enriched metadata 46 in memory 22 and replace it with the extracted term 26 "Inventory," column name 28 "Product," and field 30 "A". If the user input or predetermined variables and setting call for a delta load, then enrichment engine 42 uploads any of the enriched metadata 46 that is different from metadata already stored in memory 38. So, for example, if memory 22 already comprises the information that term 26 "Inventory" is associated with column name 28 "Product" and field 30 "A", enrichment engine 42 may compare the end-to-end dataflow of field 30 "A" and add any additional or missing information to that dataflow.

At step 112, enrichment engine 42 generates a journal with details of the full load or the delta load performed at step 110. This journal may comprise information including the time that the upload occurred, details about the full load and/or delta load including any information that was uploaded into memory 22, or any other similar information. For example, the journal may include the information that the dataflow for product "A" was augmented in the previous delta load. Next, at step 114, as illustrated below in FIG. 4 and discussed in greater detail below, transmission engine 44 displays the end-to-end dataflow of the enriched metadata 46 on a portal 48 or user interface. Further, at step 116, transmission engine 44 transmits information about the column names 28 and fields 30 without associated terms 26 and terms 26 without associated column names 28 and fields 30 to a user or other relevant system. Transmission engine 44 may transmit this information using any suitable means including by emailing the user the missing information and requesting that the user provide the missing information.

FIG. 4 illustrates one embodiment of an end-to-end dataflow 160 displayed on portal 48. As illustrated, portal 48 may have a GUI 150 that illustrates the original source of data such as a field 30 and the end-to-end dataflow 160 showing the intermediary programs and repositories that received and provisioned the field 30. In the illustrated embodiment, field 30 "A" originates from original file repository 12a and is transmitted to a second repository or program 152a. From there, field "A" 30 is transmitted to a third repository or program 152b and onto final file repository 14a. Final file repository 14a then provisions field "A" 30 to database 22. In this manner, transmission engine 44 displays the end-to-end dataflow 160 of the enriched metadata 46 for a user or third parties, such as a regulator, to access.

Transmission engine 44 improves the functioning of the portal 48 system and of computers generally in several different ways. By transmitting data 16 and first metadata 18 that has been aggregated and enriched prior to being transmitted, transmission engine 44 allows portal 48 to receive information in a manner that can be used and manipulated by portal 48 without consuming considerable computing resources. For example, if portal 48 received data 16 and first metadata 18 directly from file repositories 12 and 14 instead of through transmission engine 44, portal 48 would need to dedicate resources to determine the lineage of data in repositories 12 and 14 which would then restrict the capabilities of portal 48. Further, because portal 48 receives enriched data 46 that has already been filtered and sorted, the computer functionality of portal 48 is improved because portal 48 can store enriched data 46 using lesser memory resources.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. §

112(f) as it exists on the date of filing hereof unless the words "means for" or "step for" are explicitly used in the particular claim.

What is claimed is:

1. A system comprising:
   a database operable to store a plurality of files and a memory operable to store metadata;
   an extraction engine operable to, via a computer processor:
   extract, from a selected file of the plurality of files, one or more column names, each column name identifying a column within the selected file;
   extract, from the selected file, one or more file fields comprising data stored in one or more fields of the selected file;
   extract, from the selected file, one or more terms identifying the selected file in the database;
   extract metadata identifying source information of the one or more extracted column names, file fields, and terms; and
   associate one or more of the extracted column names and extracted file fields with one or more of the extracted terms to produce associated data;
   identify one or more instances of unassociated data by determining that:
   an extracted term does not correspond to at least one of the extracted column names or at least one of the extracted file fields;
   an extracted column name does not correspond to at least one of the extracted terms or at least one of the extracted file fields; or
   a file field does not correspond to at least one of the extracted terms or the extracted column names;
   an enrichment engine operable to, via a computer processor:
   determine an end-to-end dataflow of the associated data by identifying one or more sources of the extracted columns, file fields, and terms from the extracted metadata;
   load the associated data into the memory wherein loading data into the memory comprises performing either:
   a full load comprising loading all the associated data onto the memory; or
   a delta load comprising comparing the extracted database columns, file fields, and terms with data stored in the memory and loading any different data from the extracted data onto the memory; and
   generate a journal recording metadata associated with the full load or the delta load;
   a portal for displaying, via the computer processor, the end-to-end dataflow of the associated data on a user interface; and
   a transmission engine operable to, via the computer processor, transmit a communication identifying the one or more instances or unassociated data.

2. The system of claim 1, wherein the metadata further comprises information about a number of repositories traversed by the one or more extracted file fields and determining the end-to-end dataflow of the associated data further comprises determining a total number of repositories traversed by a file field.

3. The system of claim 1, wherein performing the full load further comprises:
   identifying one or more duplicative file fields in the extracted file fields;
   identifying the duplicative file field with a highest total number of traversed repositories; and
   deleting the duplicative file fields with fewer than the highest total number of traversed repositories.

4. The system of claim 1, wherein performing the full load further comprises consolidating duplicate data within the extracted data by keeping more recent data and deleting less recent data.

5. The system of claim 4, wherein performing the full load further comprises enriching the associated data with information about whether the associated data is confidential, proprietary, public, or non-defined.

6. The system of claim 1, wherein transmitting communication identifying incomplete associated data further comprises transmitting information identifying one or more extracted database columns with no associated term name.

7. The system of claim 1, wherein transmitting communication further comprises transmitting an email identifying the incomplete associated data.

8. A method comprising:
   extracting, by at least one processor, one or more column names from a selected file stored to a database operable to store a plurality of files, wherein each column name identifies a column within the selected file;
   extracting, by the at least one processor, one or more file fields comprising data stored in one or more fields of the selected file;
   extracting, by the at least one processor, one or more terms identifying the selected file in the database;
   extracting metadata identifying source information of the one or more extracted column names, file fields, and terms; and
   associating one or more of the extracted column names and extracted file fields with one or more of the extracted terms to produce associated data;
   identifying one or more instances of unassociated data by determining that:
   an extracted term does not correspond to at least one of the extracted column names or at least one of the extracted file fields;
   an extracted column name does not correspond to at least one of the extracted terms or at least one of the extracted file fields; or
   a file field does not correspond to at least one of the extracted terms or the extracted column names;
   determining an end-to-end dataflow of the associated data by identifying one or more sources of the extracted columns, file fields, and terms from the extracted metadata;
   loading the associated data into the memory wherein loading data into the memory comprises performing either:
   a full load comprising loading all the associated data onto the memory; or
   a delta load comprising comparing the extracted database columns, file fields, and terms with data stored in the memory and loading any different data from the extracted data onto the memory;
   generating a journal recording metadata associated with the full load or the delta load;
   displaying the end-to-end dataflow of the associated data on a user interface; and
   transmitting a communication identifying the one or more instances of unassociated data.

9. The method of claim 8, wherein the metadata further comprises information about a number of repositories traversed by the one or more extracted file fields and determining the end-to-end dataflow of the associated data further comprises determining a total number of repositories traversed by a file field.

10. The method of claim 8, wherein performing the full load further comprises:
    identifying one or more duplicative file fields in the extracted file fields;
    identifying the duplicative file field with a highest total number of traversed repositories; and
    deleting the duplicative file fields with fewer than the highest total number of traversed repositories.

11. The method of claim 8, wherein performing the full load further comprises consolidating duplicate data within the extracted data by keeping more recent data and deleting less recent data.

12. The method of claim 8, wherein performing the full load further comprises enriching the associated data with information about whether the associated data is confidential, proprietary, public, or non-defined.

13. The method of claim 8, wherein transmitting communication identifying incomplete associated data further comprises transmitting information identifying one or more extracted database columns with no associated term name.

14. The method of claim 8, wherein transmitting communication further comprises transmitting an email identifying the incomplete associated data.

15. One or more computer readable non-transitory storage media embodying software that is operable when executed by at least one processor to:
    extract one or more column names from a selected file stored to a database operable to store a plurality of files, wherein each column name identifies a column within the selected file;
    extract one or more file fields comprising data stored in one or more fields of the selected file;
    extract one or more terms identifying the selected file in the database;
    extract metadata identifying source information of the one or more extracted column names, file fields, and terms; and
    associate one or more of the extracted column names and extracted file fields with one or more of the extracted terms to produce associated data;
    identify one or more instances of unassociated data by determining that:
        an extracted term does not correspond to at least one or the extracted column names or at least one of the extracted file fields;
        an extracted column name does not correspond to at least one of the extracted terms or at least one of the extracted file fields; or
        a file field does not correspond to at least one or the extracted terms or the extracted column names;
    determine an end-to-end dataflow of the associated data by identifying one or more sources of the extracted columns, file fields, and terms from the extracted metadata;
    load the associated data into the memory wherein loading data into the memory comprises comparing the extracted database columns, file fields, and terms with data stored in the memory and loading any different data from the extracted data onto the memory;
    display the end-to-end dataflow of the associated data on a user interface; and
    transmit a communication identifying the one or more instances of unassociated data.

16. The media of claim 15, wherein the metadata further comprises information about a number of repositories traversed by the one or more extracted file fields and wherein the enrichment engine is further operable to determine the end-to-end dataflow of the associated data by determining a total number of repositories traversed by a file field.

17. The media of claim 15, wherein loading the associated data further comprises:
    identifying one or more duplicative file fields in the extracted file fields;
    identifying the duplicative file field with a highest total number of traversed repositories; and
    deleting the duplicative file fields with fewer than the highest total number of traversed repositories.

18. The media of claim 15, wherein loading the associated data further comprises consolidating duplicate data within the extracted data by keeping more recent data and deleting less recent data.

19. The media of claim 15, wherein loading the associated data further comprises enriching the associated data with information about whether the associated data is confidential, proprietary, public, or non-defined.

20. The system media of claim 15, wherein the loading of the associated data is either a full load or a delta load, wherein:
    the full load comprises loading all the associated data onto the memory; or
    the delta load comprises comparing the extracted database columns, file fields, and terms with data stored in the memory and loading any different data from the extracted data onto the memory.

* * * * *